United States Patent
Ilchyshyn et al.

(10) Patent No.: US 10,052,558 B2
(45) Date of Patent: Aug. 21, 2018

(54) METHOD, APPARATUS AND SYSTEM OF AN ELECTRONIC PUZZLE GAME INVOLVING EXTENDABLE LINES FORMING A PUZZLE IMAGE

(71) Applicants: Stepan Ilchyshyn, Lviv (UA); Oleh Vasylevych, Lviv (UA); Ihor Ostapenko, Lviv (UA)

(72) Inventors: Stepan Ilchyshyn, Lviv (UA); Oleh Vasylevych, Lviv (UA); Ihor Ostapenko, Lviv (UA)

(73) Assignee: STIGOL LLC, Lviv (UA)

( * ) Notice: Subject to any disclaimer, the term of this patent is extended or adjusted under 35 U.S.C. 154(b) by 1076 days.

(21) Appl. No.: 14/328,733

(22) Filed: Jul. 11, 2014

(65) Prior Publication Data

US 2015/0057059 A1 Feb. 26, 2015

Related U.S. Application Data (60) Provisional application No. 61/867,615, filed on Aug. 20, 2013.

(51) Int. Cl.

| | |
|---|---|
| *A63F 13/40* | (2014.01) |
| *A63F 9/06* | (2006.01) |
| *A63F 13/2145* | (2014.01) |
| *A63F 13/80* | (2014.01) |

(52) U.S. Cl.
CPC ............ *A63F 13/40* (2014.09); *A63F 9/0613* (2013.01); *A63F 13/2145* (2014.09); *A63F 13/80* (2014.09)

(58) Field of Classification Search
CPC ................... G09B 19/00; A63F 9/24
USPC ......................................... 434/261
See application file for complete search history.

(56) References Cited

U.S. PATENT DOCUMENTS

| | | | |
|---|---|---|---|
| 2011/0244937 A1* | 10/2011 | Yamashita | A63F 13/80 463/9 |
| 2012/0077165 A1* | 3/2012 | Liang | G09B 11/06 434/261 |

* cited by examiner

*Primary Examiner* — Dmitry Suhol
*Assistant Examiner* — Ankit Doshi
(74) *Attorney, Agent, or Firm* — Raj Abhyanker, P.C.

(57) ABSTRACT

A method, apparatus, and/or a system of an electronic puzzle game comprising a set of extendable lines combinable to form a puzzle image is disclosed. In one embodiment, an electronic puzzle game includes a set of instructions, which when operated through a processor communicatively coupled with a memory operate in a manner to: generate a set of positions, wherein when at least some of the set of positions are combined together along a predetermined pathway, the combined ones of the set of positions form a puzzle image, generate a plurality of lines that are maneuverable onto each of the set of positions through a control interface, and extend the plurality of lines responsive to an action of a user along the set of positions, and when the plurality of lines are extended across the predetermined pathway by the user, the extended lines combine together to render the puzzle image.

11 Claims, 11 Drawing Sheets

METHOD, APPARATUS AND SYSTEM OF AN ELECTRONIC PUZZLE GAME INVOLVING EXTENDABLE LINES FORMING A PUZZLE IMAGE

CLAIM OF PRIORITY

This application is a non-provisional conversion application and claims benefit of Application No. 61/867,615 titled METHOD, DEVICE, AND GRAPHICAL USER INTERFACE FOR AN ELECTRONIC PUZZLE GAME COMPRISING OF LINES filed on Aug. 20, 2013.

FIELD OF TECHNOLOGY

This disclosure relates generally, in one example embodiment, to electronic games, more particularly, to a method, apparatus, and/or a system of an electronic puzzle game comprising a set of extendable lines combinable together to form a puzzle image.

BACKGROUND

With the rise in popularity of mobile gaming, particularly games on touch-screen enabled smartphones and tablet computers, there is a growing demand for mobile games with simplified touch-screen controls. In addition, due to the short attention span of mobile gamers, there is a demand for games that can be played in short time increments. However, such games must still capture the interest of gamers with variety and re-playability. The puzzle game disclosed herewith meets those demands with a simple touch control, a potentially unlimited number of puzzle forms, and a variety of gameplay modes.

SUMMARY

A method, apparatus, and/or a system of an electronic puzzle game comprising a set of extendable lines combinable together to form a puzzle image is disclosed. In one embodiment, an electronic puzzle game includes a set of instructions, which when operated through a processor communicatively coupled with a memory operate in a manner to: generate a set of positions, wherein when at least some of the set of positions are combined together along a predetermined pathway, the combined ones of the set of positions form a puzzle image, generate a plurality of lines that are maneuverable onto each of the set of positions through a control interface, and extend the plurality of lines responsive to an action of a user along the set of positions, and when the plurality of lines are extended across the predetermined pathway by the user, the extended lines combine together to render the puzzle image.

Each of the plurality of lines may be maneuverable onto each of the set of positions through a haptic gesture of the control interface on a touchscreen-enabled computing device or a slider indicator of the control interface which is adjacent to the set of positions on a display of a computing device. The set of instructions may monitor an error rate. The user to successfully solve the puzzle when the extended lines combine together to render the puzzle image in a threshold within the error rate. When extended lines are outside the threshold of the error rate, then an error may be generated. The extended lines may automatically be placed in corrected positions when maneuvered within the error rate. The electronic puzzle game may include a series of levels such that each subsequent level includes a new puzzle image that is subsequently more challenging to solve than a previous puzzle image. A particular puzzle image in each of the series of levels may include at an additional smaller hidden image. When the user discovers the additional smaller hidden image through the extended lines, the user may receive a higher score for a particular level in which the additional smaller hidden image is discovered. The electronic puzzle game may generate through the set of instructions a series of associative objects that may be portions of an individual line pathway separate from the portions of the set of positions, such that a shape of a recognizable object formed through the series of associative objects may serve as a clue to the user as to the identity of the puzzle image. At least some of the series of levels may prohibit extended lines from intersecting responsive to the action of the user although the set of positions intersect with each other.

The puzzle image may transform into an animated sequence when the extended lines combine together to render the puzzle image. The animated sequence as distributed across other graphics across the series of levels may form a story in a comic book format. The series of levels may be customizable by the user using a textual data, wherein individual characters of the textual data become portions of the puzzle image and portions of the set of positions.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus, and/or a system of an electronic puzzle game comprising a set of extendable lines combinable together to form a puzzle image is disclosed. A final puzzle image may initially be stored in a memory of the computing device. The final puzzle image may be shown to a player of the game or may be hidden from the player. In either case, a plurality of lines may be presented to the player on a display of the computing device. One objective of the game may be for the player to move the plurality of lines presented on the display to positions that construct the final puzzle image. Each of the plurality of lines may be controlled by the user through a control interface. In one aspect, the control interface may be positioned at the bottom of the display. In this aspect, the player may move each of the plurality of lines along a predetermined pathway where a portion of the predetermined pathway comprises a portion of the final puzzle image. In this aspect, the player completes the puzzle when the plurality of lines are positioned in such a way that the final puzzle image is revealed to the player.

Methods, devices, and/or graphical user interfaces for an electronic puzzle-type game playable on a computing device are disclosed. Although the present embodiments have been described with reference to specific example embodiments, it will be evident that various modifications and changes may be made to these embodiments without departing from the broader spirit and scope of the various embodiments.

As will be discussed in detail below, the computing device may be a smartphone (e.g., iPhone®), tablet computer (e.g., iPad®), personal computer, laptop, video game system (e.g. Xbox 360®, PlayStation 3®, Nintendo DS®), or any other computing device capable of processing the electronic puzzle-type game. The individual puzzles may be stored in a memory on the computing device, or may be delivered to a client device of the player from a server through a network. A variety of programming languages may be used to program the electronic puzzle-type game, including, but are not limited to: C#, C++, Java, Objective C, and/or HLSL. In addition, a plurality of development kits may be used to create the electronic puzzle-type game, including, but not limited to: Unity3D® and/or the mobile platform's native software development kit (SDK).

In one embodiment, the objective of the line puzzle game is to move a plurality of lines back and forth along each line's respective pathway to discover and create a hidden puzzle image. Portions of the line pathways may intersect or overlap with portions of the puzzle image, so it is for the player to discover which position of the line along its pathway is actually a portion of the puzzle image. Once all lines intersect or overlap with their respective portions of the hidden puzzle image within a particular error rate, the player will have successfully solved the puzzle and the lines will come together to form the hidden image. For the sake of convenience and simplicity, the puzzle line game will be described with reference to a touch-screen capable computing device (e.g., a smartphone or a tablet computer).

Figure 1A:
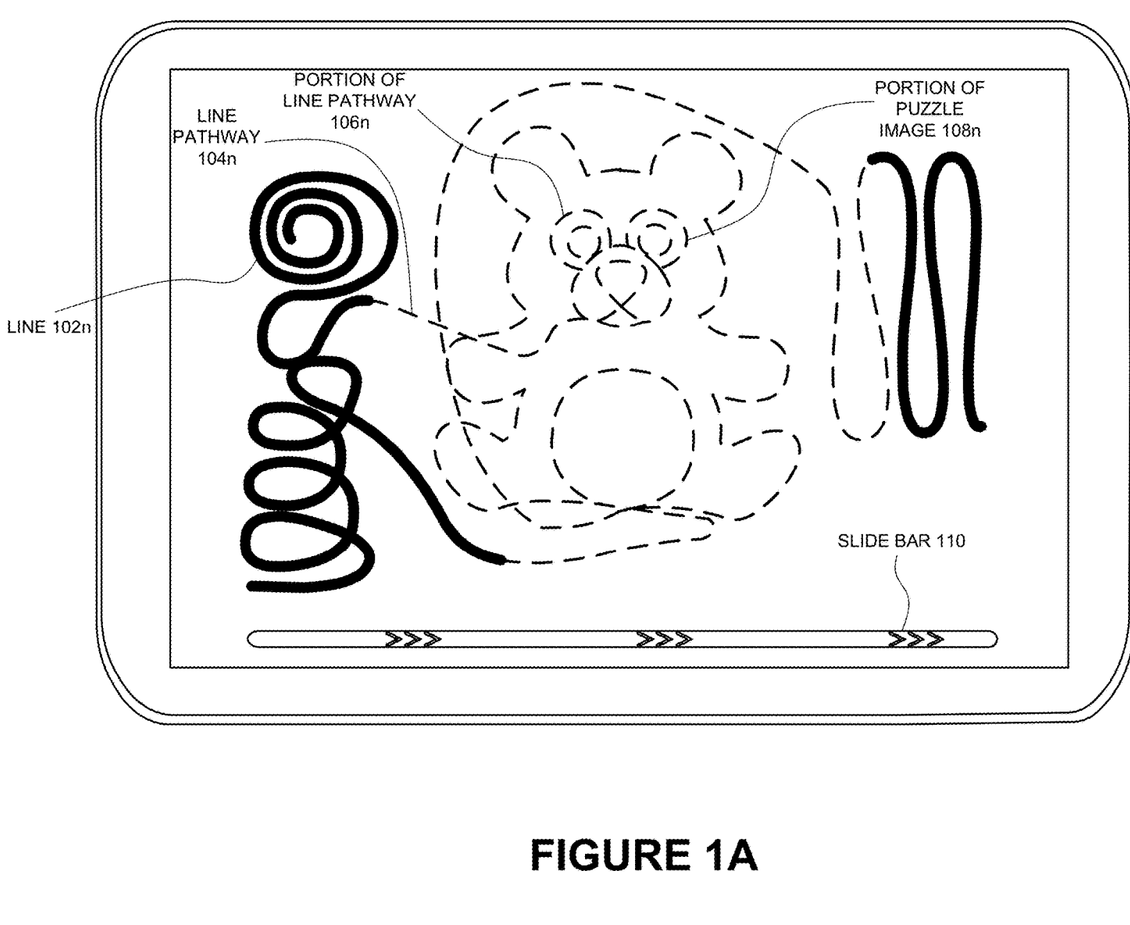
FIGS. 1A-1I are user interface views of a line puzzle game according to one or more example embodiments.

Reference is now made to FIGS. 1A-1I, which illustrate various user interface views of the line puzzle game. As shown in FIG. 1A, the line puzzle game may comprise a plurality of lines 102n. In one example embodiment, each line 102n presented has its own respective line pathway 104n where a portion of the line's pathway 106n is a portion of the puzzle image 108n. The line puzzle interface may also comprise of a slide bar 110.

In one embodiment, a level of the line puzzle game may comprise of a final puzzle image 108. The final puzzle image may be created by tracing a predetermined image (e.g., a tracing of a photograph) or may be drawn independently or manually. In the example embodiments illustrated in FIGS. 1A-1I, the final puzzle image 108 is of a bear. The final puzzle image 108 may then be divided into portions of the puzzle image 108n. In the example embodiments illustrated in FIGS. 1A-1I, the puzzle image 108 is divided into three portions of the puzzle image 108n. Each portion of the puzzle image 108n may also be a portion of a line pathway 106n. The portion of the line pathway 106n may be a portion or fragment of a larger line pathway 104n. The remainder of the line pathway 104n may be predetermined or may be dynamically or randomly generated according to Bezier curves. In another embodiment, line pathways 104n may be generated using an array of points, or through the use of polynomial equations. Along each line pathway 104n is a line 102n. The line 102n may be moveable along the line pathway 104n through an interaction with a slide bar 110. In one embodiment, only one line 102n may be moved at any one time. To move a different line 102n, the user or player may select a different line 102n and that line 102n then becomes moveable. The manner in which different lines 102n may be selected may depend on the particular computing device in which the line puzzle game is running (e.g., by 'tapping' with one's finger on a tablet computer or smartphone, or by a computer mouse or key entry on a personal computer or laptop).

Figure 1B:
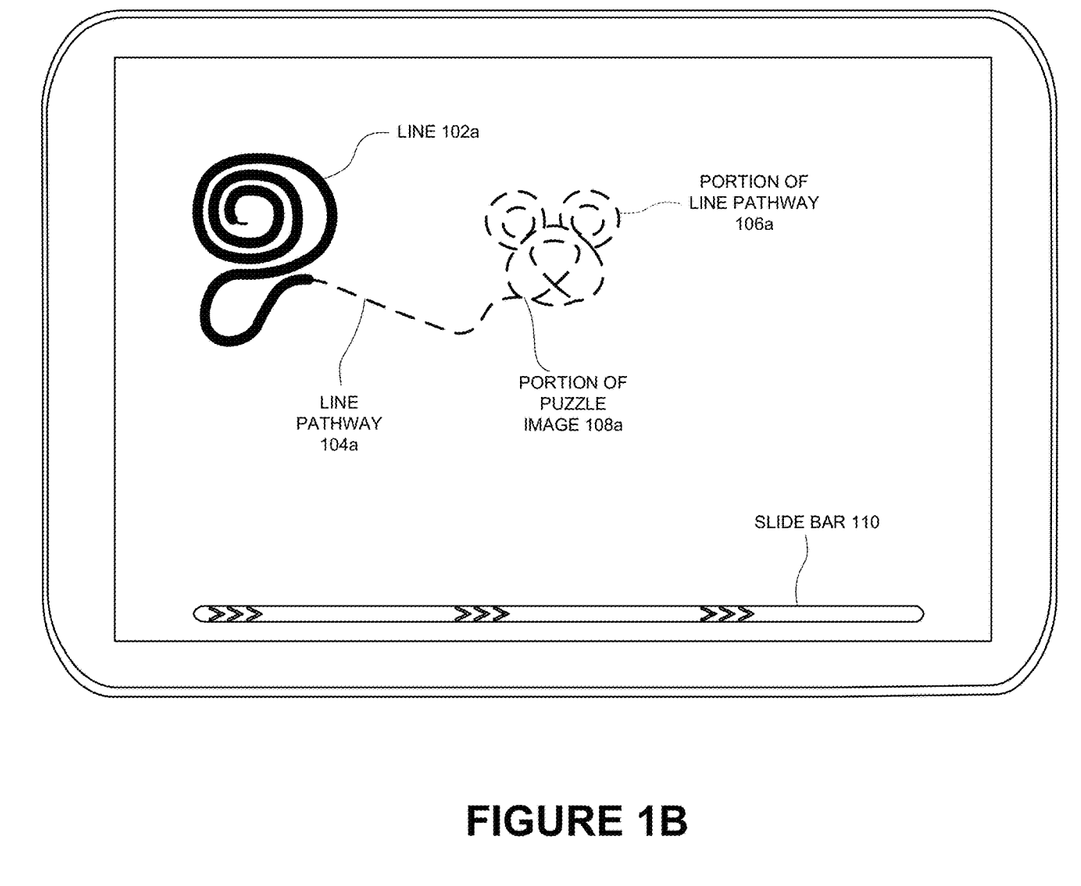
Figure 1C:
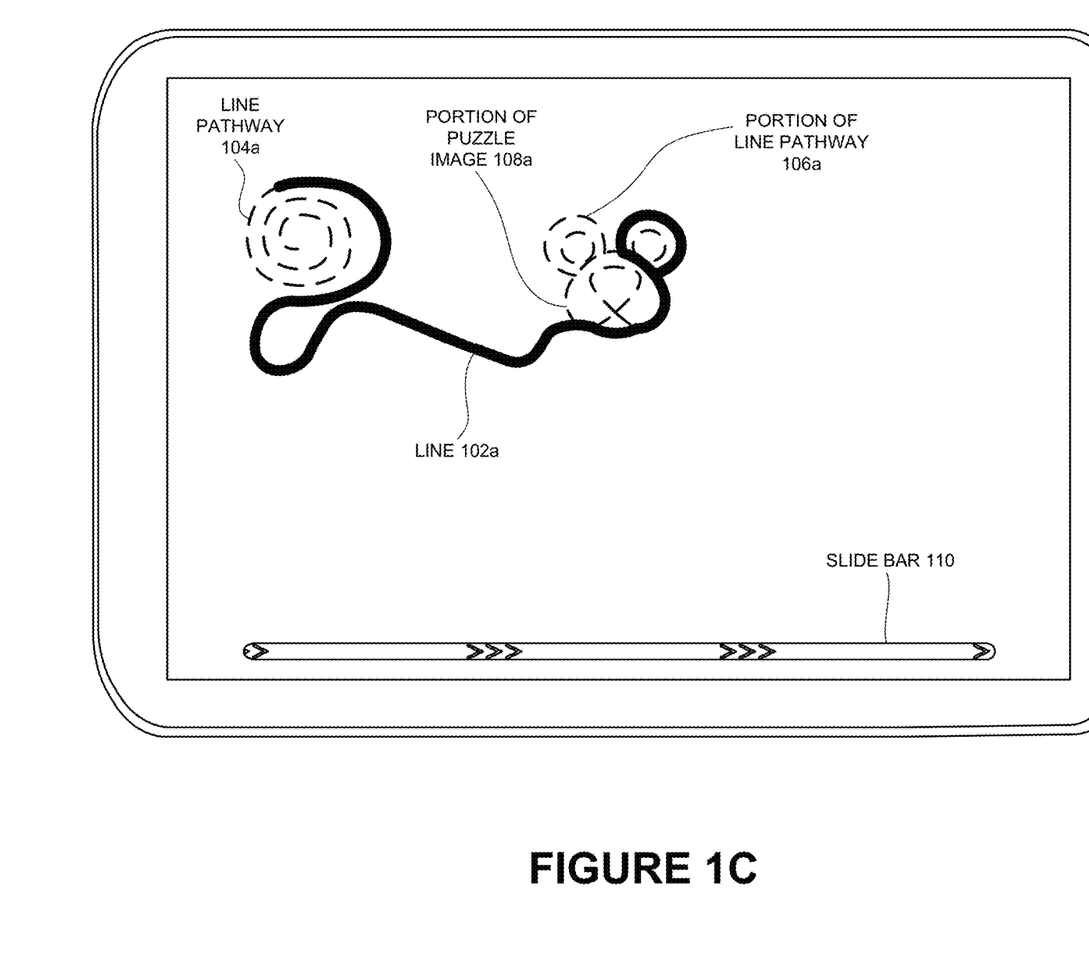

FIG. 1B illustrates a line 102a, a line pathway 104a, and a portion of the line pathway 106a. The portion of the line pathway 106a is also a portion of the puzzle image 108a. A user may slide (e.g. using the user's finger, a stylus, or any other functioning method) the slide bar 110 horizontally to move the line 102a along the line pathway 104a. According to one embodiment, sliding the slide bar 110 right moves the line 102a forward along the pathway 104a, and sliding the slide bar 110 left moves the line 102a backward along the pathway 104a. In one example embodiment, the user may slide on a particular portion of the touch screen display without any need for the slide bar 110. FIG. 1C illustrates a partial move forward of the position of the line 102a along the pathway 104a from the previous position illustrated in FIG. 1B.

Figure 1D:
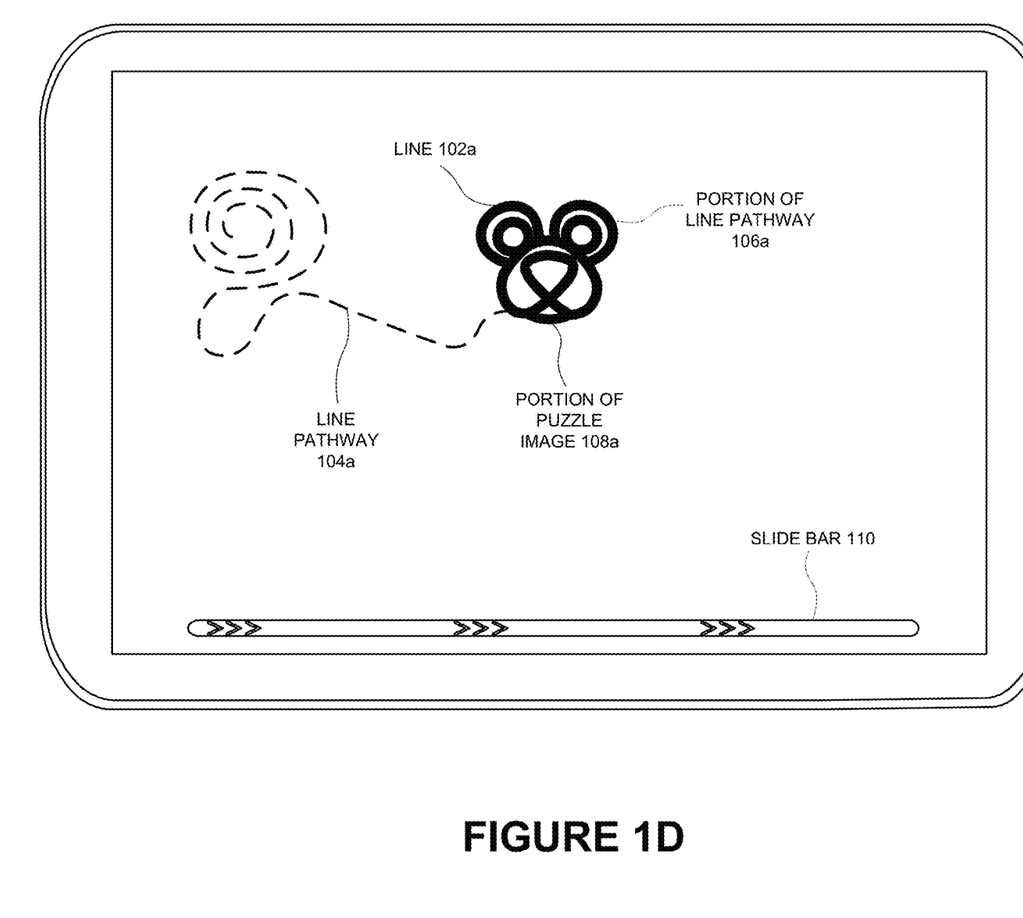

FIG. 1D illustrates the line 102a overlapping the portion of the line pathway 106a that is also the portion of the puzzle image 108a, according to one embodiment.

Figure 1E:
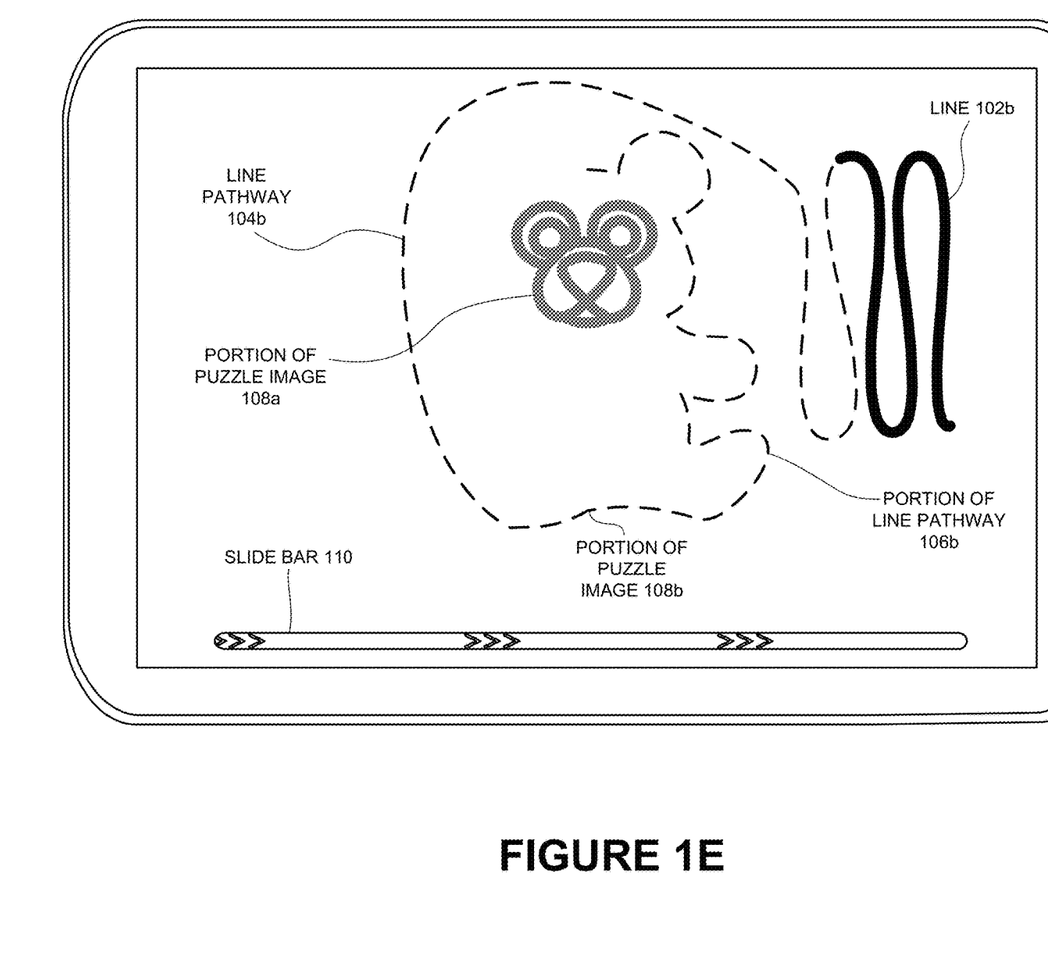
Figure 1F:
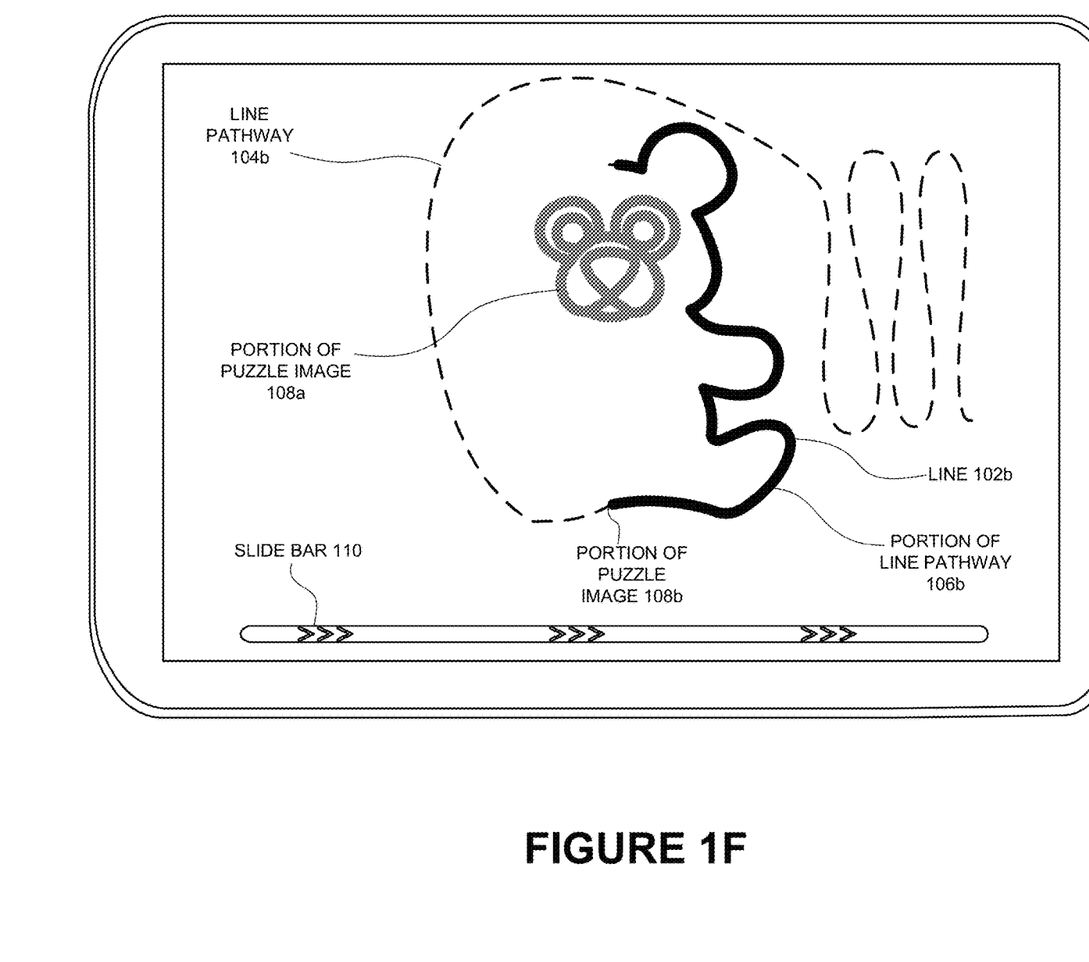
Figure 1G:
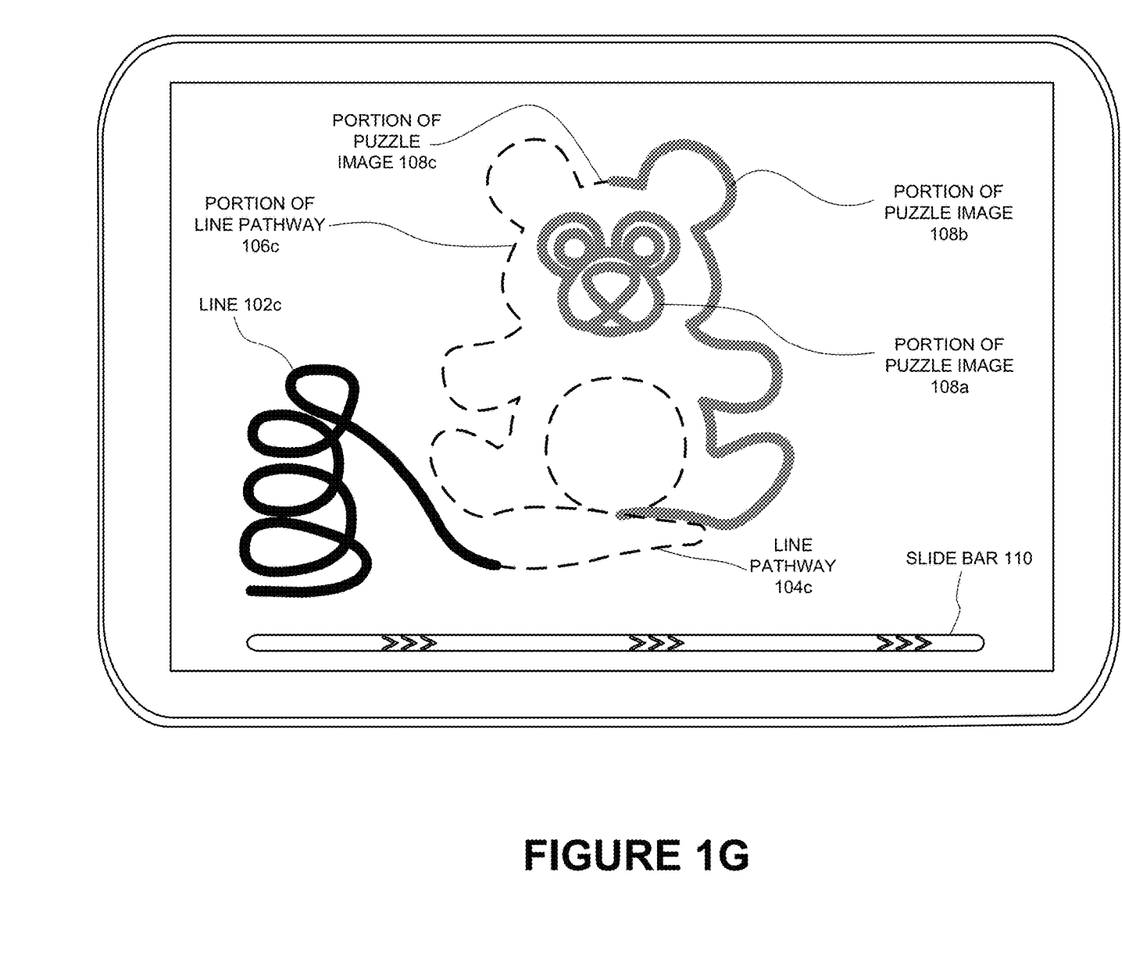
Figure 1H:
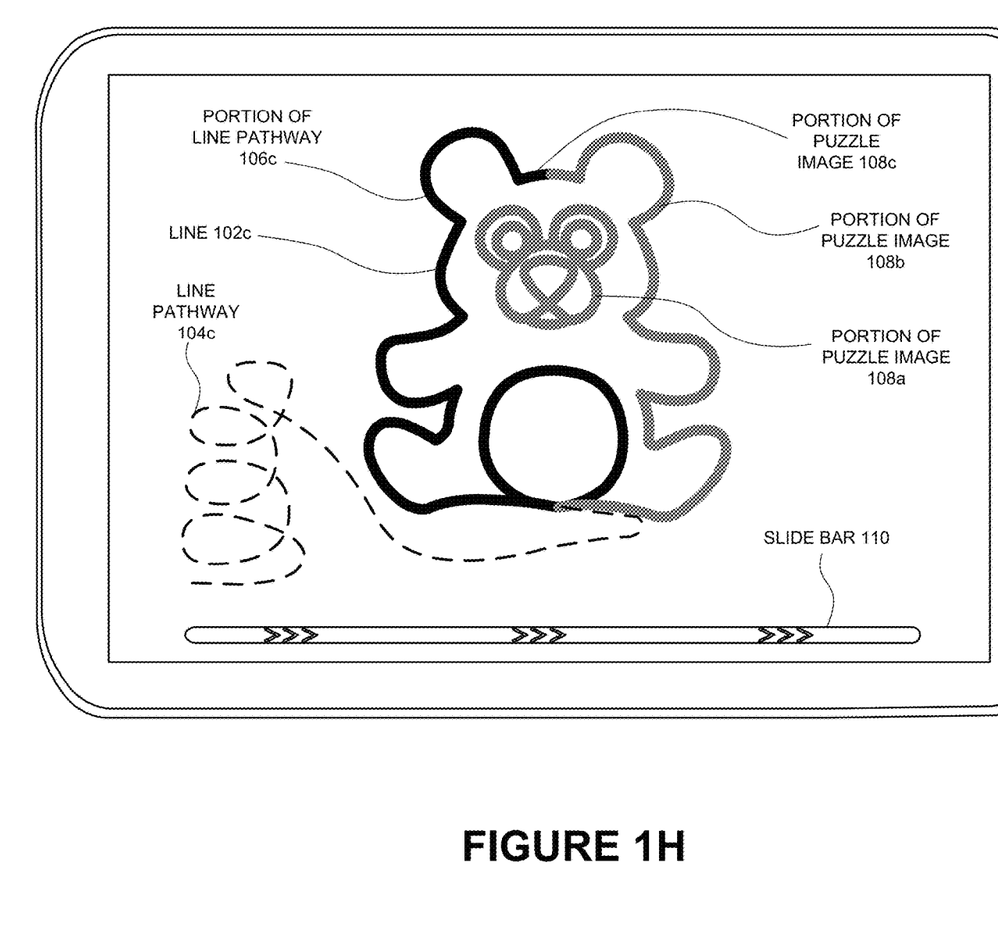

Similarly, FIG. 1E illustrates another line 102b, another line pathway 104b, and a portion of the other line pathway 106b. The portion of the line pathway 106b is also another portion of the puzzle image 108b. The user may slide the slide bar 110 horizontally to move the line 102b forward or backward along the line pathway 104b. FIG. 1F illustrates the line 102b overlapping the portion of the line pathway 106b that is also the portion of the puzzle image 108b. FIG. 1G illustrates a third line 102c, a third line pathway 104c, and a portion of the third line pathway 106c. The portion of the third line pathway 106c is also a third portion of the puzzle image 108c. The user may slide the slide bar 110 horizontally to move the line 102c forward and backward along the line pathway 104c. FIG. 1H illustrates the line 102c overlapping the portion of the line pathway 106c that is also the portion of the puzzle image 108c.

Figure 1I:
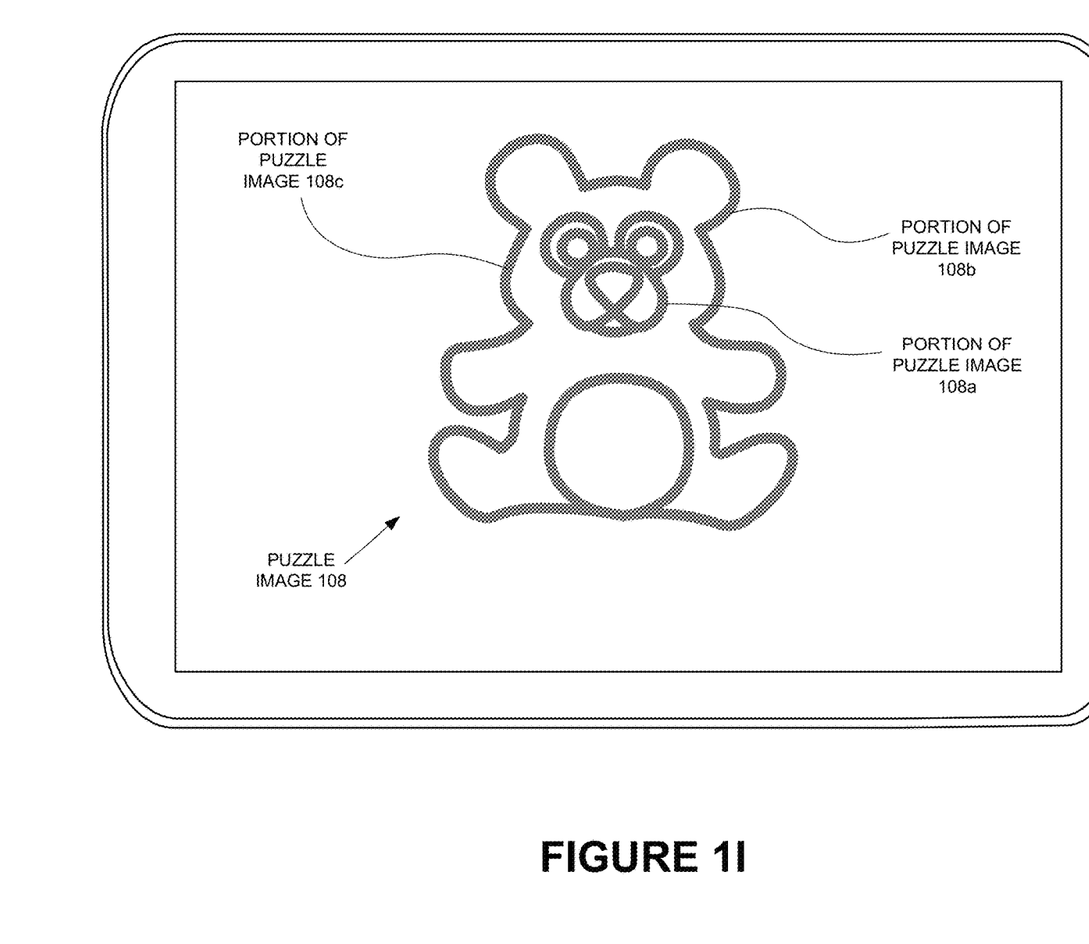

FIG. 1I illustrates the completed puzzle image 108, after lines 102a, 102b, and 102c have been moved to overlap the portions of the final puzzle image 108a, 108b, and 108c respectively. Therefore, as can be seen from the example embodiment as illustrated in FIGS. 1A-1I, puzzle images 108 are completed by moving a line 102n to a particular position along its respective line pathway 104n such that it overlaps a portion of the final puzzle image 108n, which is also a portion of the line pathway 106n. When all lines 102n overlap their respective portions of the final puzzle image 108n, the puzzle is complete.

According to one embodiment, the line pathways 104n may have two fixed points on either end of the line pathway 104n, as is illustrated in FIGS. 1A-1H. Within such an embodiment, a user may slide the line 102n only as far as these end points. According to another embodiment, the line pathway 104n may not have any fixed points, but may rather comprise of a continuous loop, such that the line 102n may move indefinitely in either direction along the loop (i.e. the line pathway 104n). Furthermore, according to one embodiment, the line pathways 104n may be visible. This may be particularly useful, for example, for tutorial levels. In other embodiments, the line pathways 104n may be invisible. It may be intended that the standard puzzle may have the line pathway 104n invisible.

In one or more embodiments, the initial line 102n position, the line 102n length, the line pathway 104n, and puzzle image 108 may be predetermined. In another embodiment, only the puzzle image 108, portions of the puzzle image 108n (and consequently portions of the line pathway 106n), and line 102n length may be predetermined, while the line 102n position and line pathway 104—except for the portion of the line pathway 106n that is also the portion of the puzzle image 108n—may be randomly generated.

In one or more embodiments, various control mechanisms may be used to move the line 102n along its respective pathway 104n, particularly when the puzzle game is played on various computing devices other than a touch-screen enabled computing device. Various control mechanisms may include, but are not limited to: a left button and right button, a control stick, a scroll wheel, and motion control.

Figure 2:
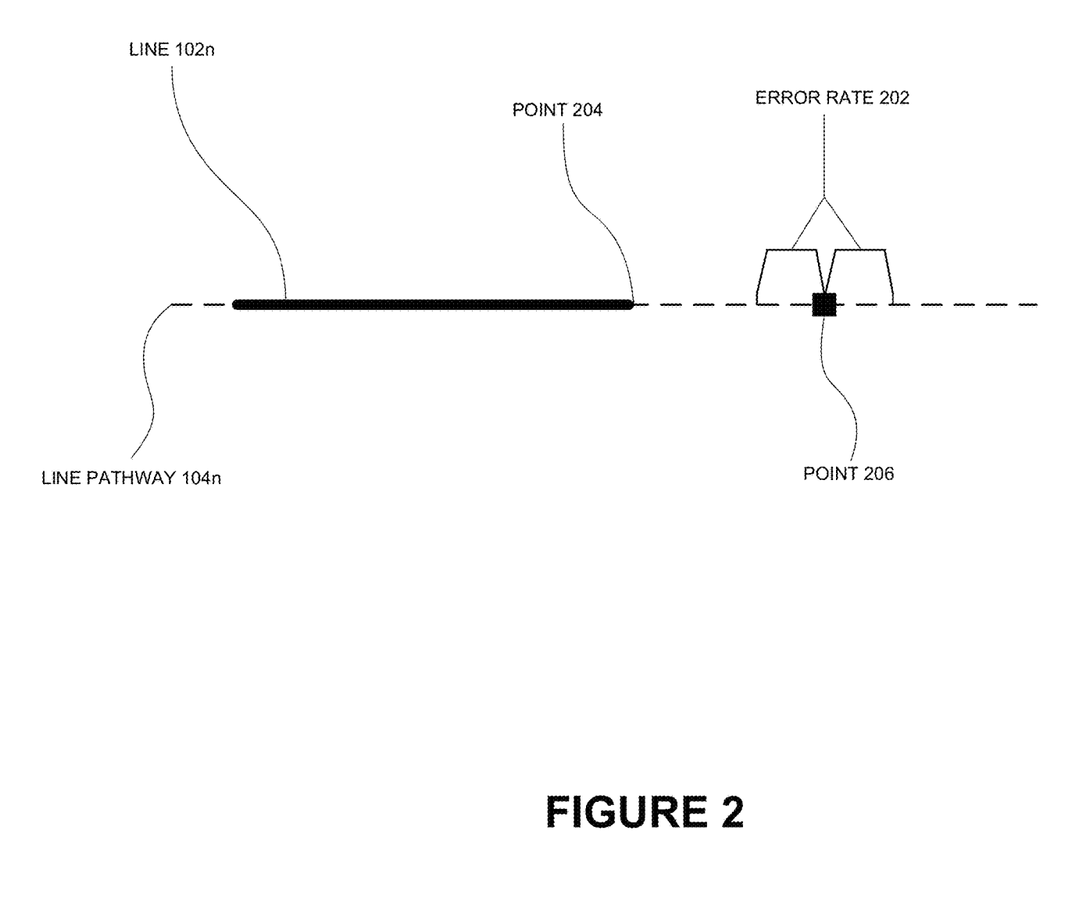
FIG. 2 is a schematic of an error rate system, according to one or more example embodiments.

Reference is now made to FIG. 2 which illustrates automatic line 102n position correction based on an error rate 202. In one embodiment, the line puzzle game may automatically move a line 102n into its correct position (i.e. 100% overlapping its respective portion of the puzzle image 108n) if the line is within a particular error rate 202. The line 102n may be of a fixed length, with one or both ends of the line 102n having a point 204. Similarly, the portion of the puzzle image 108n may be of a fixed length, and may have a point 206 on one or both ends. When the point 204 of the line 102n meets exactly the point 206 of the portion of the puzzle image 108n, the line 102n can be considered to be in the correct position.

An error rate 202 may be a particular distance on either end of the point 206 of the portion of the puzzle image 108n. When the point 204 of the line 102n is within the error rate 202, the line puzzle game may automatically move the line 102n along its respective line pathway 104n the remaining distance to the fully correct position. In one example embodiment, only one line 102n at a time need be within the error rate 202 for the line 102n to be automatically moved into the fully correct position. In another example embodiment, all lines 102n need to be within their respective error rates 202 before the lines 102n are moved into their fully correct positions. The length of the error rate 202 may be predetermined, according to one embodiment. According to another embodiment, the error rate 202 may be automatically generated based on line 102n length, portion of the puzzle image 108n length, complexity of the puzzle image 108, and/or number of lines 102n.

A standard level of the line puzzle game may typically comprise of a hidden puzzle image to be constructed by the plurality of lines discussed above. However, a variety of gameplay variations will be discussed below. It may be appreciated that the gameplay variations may not be limited to what is disclosed herewith, and a variety of other gameplay variations may be implemented without departing from the broader spirit and scope of the present embodiments.

According to one additional embodiment of the game, the line puzzle game may also feature tutorial and/or kids' levels. In these levels, solving the hidden puzzle image may be made easier by visible line pathways, fixed-point line pathways (i.e., pathways that are not loops), larger error rates, visual and/or text clues, and/or simplified images.

According to a second additional embodiment of the game, a particular puzzle may also feature one or more additional smaller images. These smaller hidden images may also be comprised of one or more image portions, each of these image portions also being portions of the line pathways, and can be completed in the same manner that the main puzzle image may be completed (i.e. moving the lines to overlap the portions of the puzzle image). In one embodiment, the smaller hidden image must be discovered and completed before the main puzzle image in order for the puzzle to be complete. In another embodiment, finding, discovering, and completing the smaller hidden images may provide a higher score for the level, if a scoring system is implemented.

According to a third additional embodiment of the game, a puzzle may also feature associative objects. Associative objects may be portions of an individual line pathway—separate from the portion of the line pathway that is also the portion of the puzzle image—that forms the shape of a recognizable object. The shape of the recognizable object may serve as a clue or hint to the user as to what the main puzzle image may be. Finding or discovering the associative object may not be required to complete the puzzle, but may serve as a clue or hint to the user, according to one embodiment.

According to a fourth additional embodiment of the game, some levels may comprise of a single line pathway. Within this embodiment, the portions of the puzzle image may lie along a single line pathway, as opposed to multiple line pathways.

According to a fifth additional embodiment of the game, some levels may prohibit lines from intersecting, although the line pathways may intersect. Within this embodiment, a user must avoid intersecting the multiple lines as he or she moves them along their respective line pathways while discovering and completing the puzzle image.

According to a sixth additional embodiment of the game, once a puzzle image has been completed, it may allow the player or user to interact with the image or may trigger an animation.

According to a seventh additional embodiment of the game, some levels may include additional puzzle images that are generated after the previous puzzle image has been completed, using the same lines but different line pathways. This feature may be used, for example, to create a comic book effect wherein each subsequent puzzle image represents a subsequent panel in a comic book.

According to an eighth additional embodiment of the game, users may create customizable levels using text. A user can select a text, and the puzzle image will comprise of the text wherein individual characters may become portions of the puzzle image and portions of the line pathways. The number of lines may correspond to the number of characters. The remainder of each line's respective line pathway may be randomly generated, according to one embodiment.

According to a ninth additional embodiment of the game, a user may play the line puzzle game competitively with another user in a variety of manners. In one embodiment, a puzzle image may be duplicated on one computing device display, and each user must complete the puzzle image separately. In another embodiment, two or more users can play the same puzzle on separate computing devices while connected through a network. Competition may be based on score, accuracy, and/or speed of completion of the puzzle. In another embodiment, two or more users may play the line puzzle game cooperatively by playing the same puzzle on one computing device wherein each user is only allowed to control a subset of lines. In another embodiment, a user may compete asynchronously with a second user using the second user's game data. One user's data regarding the completion of a given puzzle may be saved on a third party server.

This data may include time, line number, action type, and action ID and may enable the completion of the puzzle to be recreated on a separate computing device.

According to a tenth additional embodiment of the game, a level creation mode may be implemented. In this mode, a user may draw a puzzle image, and subsequently divide the puzzle image into portions. A number of lines may be automatically generated based on the number of portions, and the respective line pathways may be automatically generated wherein a portion of the generated line pathway is also a portion of the drawn puzzle image.

Among the variations of the puzzles may be a scoring system and/or difficulty levels. A scoring system may provide a score or points based on accuracy, speed, and distance that the lines moved. Difficulty levels may be based on number of lines, complexity of the puzzle image, length of the portions of the puzzle image, size of the error rate, and/or time requirements.

According to one embodiment, the line puzzle game may be entirely locally based on the player's computing device (i.e., the client device) without a need to connect to a network. In another embodiment, the line puzzle game may be connected to a network. Connection to a network may enable interaction with leaderboards, competitive and/or cooperative gameplay over the network, downloading of new levels, collection of game statistics, and/or social sharing (e.g. sharing customized levels and/or scores).

Figure 3:
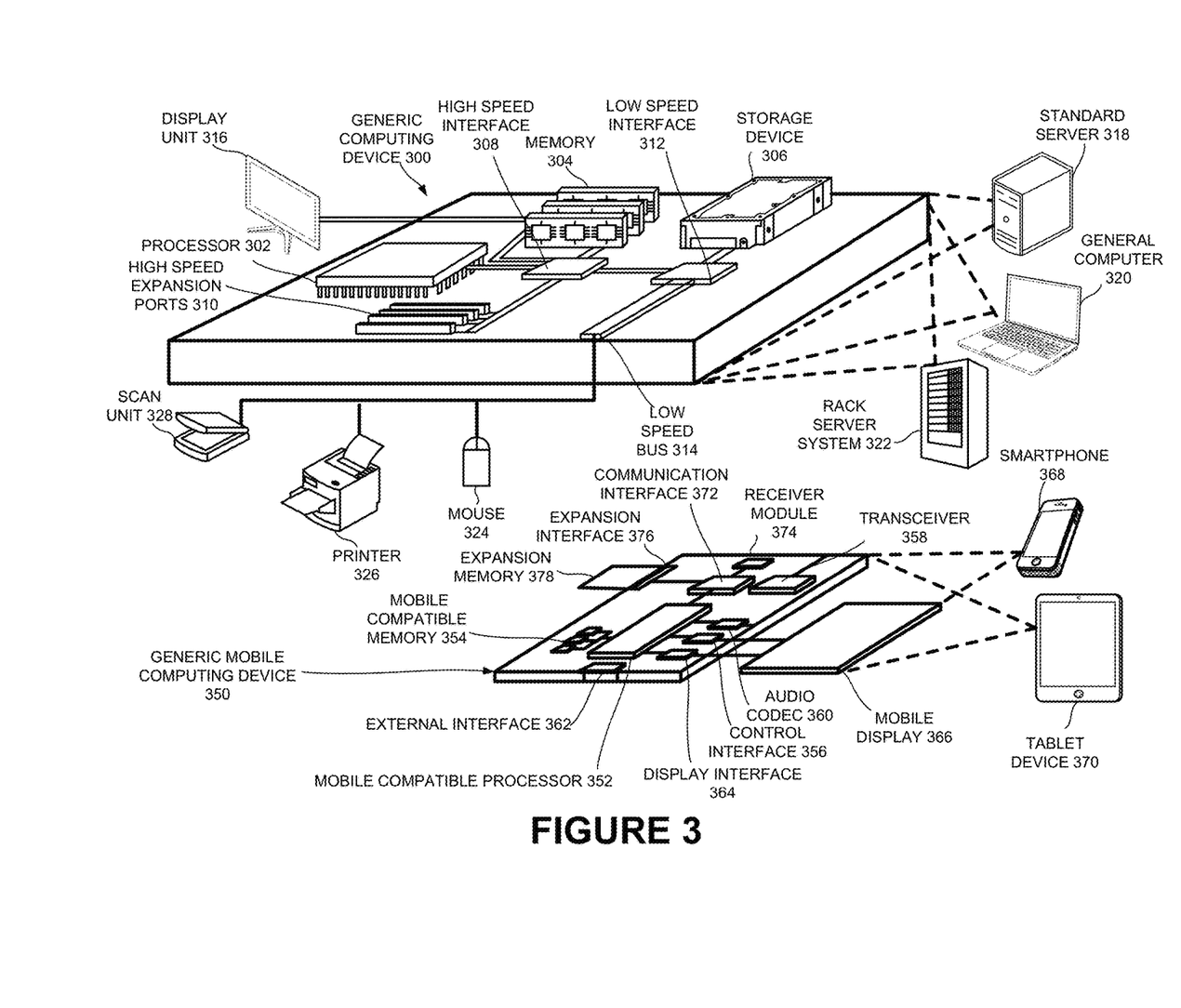
FIG. 3 is a schematic diagram of exemplary computing devices that can be used to implement the puzzle game disclosed herein.

FIG. 3 is a schematic of a generic computing device 300 and a generic mobile computing device 350 that can be used to perform and/or implement any of the embodiments disclosed herein. In one or more embodiments, the computing device disclosed above may be either the generic computing device 300 or the generic mobile computing device 350.

The generic computing device 300 may represent various forms of digital computers, such as laptops, desktops, workstations, personal digital assistants, servers, blade servers, mainframes, and/or other appropriate computers. The generic mobile computing device 350 may represent various forms of mobile devices, such as smartphones, camera phones, personal digital assistants, cellular telephones, and other similar generic mobile computing devices. The components shown here, their connections, couples, and relationships, and their functions, are meant to be exemplary only, and are not meant to limit the embodiments described and/or claimed.

The generic computing device 300 may include a processor 302, a memory 304, a storage device 306, a high speed interface 308 coupled to the memory 304 and a plurality of high speed expansion ports 310, and a low speed interface 312 coupled to a low speed bus 314 and a storage device 306. In one embodiment, each of the components heretofore may be inter-coupled using various buses, and may be mounted on a common motherboard and/or in other manners as appropriate. The processor 302 may process instructions for execution in the generic computing device 300, including instructions stored in the memory 304 and/or on the storage device 306 to display a graphical information for a GUI on an external input/output device, such as a display unit 316 coupled to the high speed interface 308. In other embodiments, multiple processors and/or multiple buses may be used, as appropriate, along with multiple memories and/or types of memory. Also, a plurality of generic computing devices 300 may be coupled with, with each device providing portions of the necessary operations (e.g., as a server bank, a group of blade servers, and/or a multi-processor system).

The memory 304 may be coupled to the generic computing device 300. In one embodiment, the memory 304 may be a volatile memory. In another embodiment, the memory 304 may be a non-volatile memory. The memory 304 may also be another form of computer-readable medium, such as a magnetic and/or an optical disk. The storage device 306 may be capable of providing mass storage for the generic computing device 300. In one embodiment, the storage device 306 may be comprised of at least one of a floppy disk device, a hard disk device, an optical disk device, a tape device, a flash memory and/or other similar solid state memory device. In another embodiment, the storage device 306 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in at least one of the memory 304, the storage device 306, a memory coupled to the processor 302, and/or a propagated signal.

The high speed interface 308 may manage bandwidth-intensive operations for the generic computing device 300, while the low speed interface 312 may manage lower bandwidth-intensive operations. Such allocation of functions is exemplary only. In one embodiment, the high-speed interface 308 may be coupled to at least one of the memory 304, the display unit 316 (e.g., through a graphics processor and/or an accelerator), and to the plurality of high speed expansion ports 310, which may accept various expansion cards. In the embodiment, the low speed interface 312 may be coupled to at least one of the storage device 306 and the low-speed bus 314. The low speed bus 314 may be comprised of a wired and/or wireless communication port (e.g., a Universal Serial Bus ("USB"), a Bluetooth® port, an Ethernet port, and/or a wireless Ethernet port). The low speed bus 314 may also be coupled to at least one of scan unit 328, a printer 326, a keyboard, a mouse 324, and a networking device (e.g., a switch and/or a router) through a network adapter.

The generic computing device 300 may be implemented in a number of different forms, as shown in the figure. In one embodiment, the generic computing device 300 may be implemented as a standard server 318 and/or a group of such servers. In another embodiment, the generic computing device 300 may be implemented as part of a rack server system 322. In yet another embodiment, the generic computing device 300 may be implemented as a general computer 320 such as a laptop computer. Alternatively, a component from the generic computing device 300 may be combined with another component in a generic mobile computing device 350. In one or more embodiments, an entire system may be made up of a plurality of generic computing devices 300 and/or a plurality of generic computing devices 300 coupled to a plurality of generic mobile computing devices 350.

In one embodiment, the generic mobile computing device 350 may comprise at least one of a mobile compatible processor 352, a mobile compatible memory 354, and an input/output device such as a mobile display 366, a communication interface 372, and a transceiver 358, among other components. The generic mobile computing device 350 may also be provided with a storage device, such as a microdrive or other device, to provide additional storage. In one embodiment, at least one of the components indicated heretofore are inter-coupled using various buses, and several of the components may be mounted on a common motherboard.

The mobile compatible processor 352 may execute instructions in the generic mobile computing device 350, including instructions stored in the mobile compatible memory 354. The mobile compatible processor 352 may be implemented as a chipset of chips that include separate and multiple analog and digital processors. The mobile compatible processor 352 may provide, for example, for coordination of the other components of the generic mobile computing device 350, such as control of user interfaces, applications run by the generic mobile computing device 350, and wireless communication by the generic mobile computing device 350.

The mobile compatible processor 352 may communicate with a user through the control interface 356 and the display interface 364 coupled to a mobile display 366. In one embodiment, the mobile display 366 may be at least one of a Thin-Film-Transistor Liquid Crystal Display ("TFT LCD"), an Organic Light Emitting Diode ("OLED") display, and another appropriate display technology. The display interface 364 may comprise appropriate circuitry for driving the mobile display 366 to present graphical and other information to a user. The control interface 356 may receive commands from a user and convert them for submission to the mobile compatible processor 352. In addition, an external interface 362 may be provide in communication with the mobile compatible processor 352, so as to enable near area communication of the generic mobile computing device 350 with other devices. External interface 362 may provide, for example, for wired communication in some embodiments, or for wireless communication in other embodiments, and multiple interfaces may also be used.

The mobile compatible memory 354 may be coupled to the generic mobile computing device 350. The mobile compatible memory 354 may be implemented as at least one of a volatile memory and a non-volatile memory. The expansion memory 378 may also be coupled to the generic mobile computing device 350 through the expansion interface 376, which may comprise, for example, a Single In Line Memory Module ("SIMM") card interface. The expansion memory 378 may provide extra storage space for the generic mobile computing device 350, or may also store an application or other information for the generic mobile computing device 350. Specifically, the expansion memory 378 may comprise instructions to carry out the processes described above. The expansion memory 378 may also comprise secure information. For example, the expansion memory 378 may be provided as a security module for the generic mobile computing device 350, and may be programmed with instructions that permit secure use of the generic mobile computing device 350. In addition, a secure application may be provided on the SIMM card, along with additional information, such as placing identifying information on the SIMM card in a non-hackable manner.

The mobile compatible memory 352 may comprise at least one of a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on at least one of the mobile compatible memory 354, the expansion memory 378, a memory coupled to the mobile compatible processor 352, and a propagated signal that may be received, for example, over the transceiver 358 and/or the external interface 362.

The generic mobile computing device 350 may communicate wirelessly through the communication interface 372, which may be comprised of a digital signal processing circuitry. The communication interface 372 may provide for communications using various modes and/or protocols, such as, at least one of: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol. Such communication may occur, for example, through the radio-frequency transceiver 358. In addition, short-range communication may occur, such as using a Bluetooth®, Wi-Fi, and/or other such transceiver. In addition, a GPS ("Global Positioning System") receiver module may provide additional navigation-related and location-related wireless data to the generic mobile computing device 350, which may be used as appropriate by a software application running on the generic mobile computing device 350.

The generic mobile computing device 350 may also communicate audibly using an audio codec 360, which may receive spoken information from a user and convert it to usable digital information. The audio codec 360 may likewise generate audible sound for a user, such as through a speaker (e.g., in a handset of the generic mobile computing device 350). Such a sound may comprise a sound from a voice telephone call, a recorded sound (e.g., a voice message, a music files, etc.) and may also include a sound generated by an application operating on the generic mobile computing device 350.

The generic mobile computing device 350 may be implemented in a number of different forms, as shown in the figure. In one embodiment, the generic mobile computing device 350 may be implemented as a smartphone 368. In another embodiment, the generic mobile computing device 350 may be implemented as a personal digital assistant ("PDA"). In yet another embodiment, the generic mobile computing device, 350 may be implemented as a tablet device 382.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal display ("LCD") monitor) for displaying information to the user and a keyboard and a mouse 324 by which the user can provide input to the computer. Other kinds of devices can be used to provide for interaction with a user as well; for example, feedback provided to the user can be any form of sensory feedback (e.g., visual feedback, auditory feedback, and/or tactile feed-back) and input from the user can be received in any form, including acoustic, speech, and/or tactile input.

The systems and techniques described here may be implemented in a computing system that comprises at least one of a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may comprise at least one of a local area network ("LAN") and a wide area network ("WAN") (e.g., the Internet). The computing system can comprise at least one of a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. An electronic puzzle game executable through a computing device, comprising:
 a set of instructions, which, when operated through a processor communicatively coupled with a memory of the computing device, operates in a manner to:
  generate a plurality of lines and a distinct corresponding predetermined line pathway for each of the plurality of lines;
  generate an initial position for the each of the generated plurality of lines
  enable maneuvering of the each of the generated plurality of lines, one line at a time, from the initial position thereof along the corresponding each predetermined line pathway to form a puzzle image through at least one of:
   a haptic gesture on a particular portion of a display screen of the computing device through which the electronic puzzle game is viewable, and
   a slider indicator on the display screen of the computing device adjacent to and outside the puzzle image,
   wherein only a portion of the corresponding each predetermined line pathway overlaps with a portion of the puzzle image such that the maneuvering of all lines along corresponding portions of predetermined line pathways thereof overlapping with portions of the puzzle image forms the puzzle image in complete; and
  render the puzzle image in complete through the display screen following the maneuvering of all the lines along the corresponding portions of the predetermined line pathways thereof overlapping with the portions of the puzzle image to form the puzzle image in complete.

2. The electronic puzzle game of claim 1, further comprising instructions to:
 monitor an error rate, wherein successful solution of a puzzle related to the electronic puzzle game comprises overlapping of the portion of the corresponding each predetermined line pathway with the portion of the puzzle image within a threshold of the error rate.

3. The electronic puzzle game of claim 2, wherein when the portion of the corresponding each predetermined line pathway overlaps with the portion of the puzzle image outside the threshold of the error rate, the electronic puzzle game comprises instructions to generate an error.

4. The electronic puzzle game of claim 2, comprising instructions to automatically place the each maneuvered line in corrected positions when maneuvered within the error rate.

5. The electronic puzzle game of claim 1, comprising instructions compatible with the electronic puzzle game comprising a series of levels such that each subsequent level includes a new puzzle image that is subsequently more challenging to solve than a previous puzzle image.

6. The electronic puzzle game of claim 5, comprising instructions compatible with a particular puzzle image in each of the series of levels comprising an additional smaller hidden image,
 wherein when the additional smaller hidden image is discovered through the maneuvering of the each of the generated plurality of lines, a user playing the electronic puzzle game receives a higher score for a particular level in which the additional smaller hidden image is discovered.

7. The electronic puzzle game of claim 1, comprising instructions compatible with a series of associative objects being portions of individual line pathways separate from the predetermined line pathways comprising the portions thereof overlapping with the portions of the puzzle image such that a shape of a recognizable object formed through the series of associative objects serves as a clue to a user playing the electronic puzzle game as to an identity of the puzzle image.

8. The electronic puzzle game of claim 5, comprising instructions compatible with at least some of the series of levels prohibiting maneuvered lines from intersecting responsive to the at least one of the haptic gesture and the slider indicator, although the corresponding predetermined line pathways intersect with each other.

9. The electronic puzzle game of claim 1, comprising instructions compatible with the puzzle image transforming into an animated sequence when the puzzle image is rendered in complete.

10. The electronic puzzle game of claim 9, comprising instructions compatible with the animated sequence being distributed across other graphics across a series of levels of the electronic puzzle game to form a story in a comic book format.

11. The electronic puzzle game of claim 5, comprising instructions compatible with the series of levels being customizable by a user playing the electronic puzzle game using a textual data,
    wherein individual characters of the textual data become the portions of the puzzle image and the portions of the predetermined line pathways.

\* \* \* \* \*